US009185719B2

(12) United States Patent
Wietfeldt et al.

(10) Patent No.: US 9,185,719 B2
(45) Date of Patent: Nov. 10, 2015

(54) METHOD AND APPARATUS FOR MAPPING APPLICATIONS TO RADIOS IN A WIRELESS COMMUNICATION DEVICE

(75) Inventors: Richard D. Wietfeldt, San Diego, CA (US); Hans Georg Gruber, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 422 days.

(21) Appl. No.: 12/857,686

(22) Filed: Aug. 17, 2010

(65) Prior Publication Data

US 2011/0199989 A1    Aug. 18, 2011

Related U.S. Application Data

(60) Provisional application No. 61/234,941, filed on Aug. 18, 2009.

(51) Int. Cl.
*H04W 4/00*        (2009.01)
*H04W 72/12*       (2009.01)
(Continued)

(52) U.S. Cl.
CPC .......... *H04W 72/1215* (2013.01); *H04W 48/18* (2013.01); *H04W 88/06* (2013.01)

(58) Field of Classification Search
CPC .......... H04W 28/021; H04W 28/0236; H04W 48/20; H04W 72/04; H04W 72/12; H04W 72/1215; H04W 88/06
USPC .................. 370/203–210, 329–334, 338–344
See application file for complete search history.

(56) References Cited

U.S. PATENT DOCUMENTS 4,933,845 A    6/1990   Hayes 5,486,210 A    1/1996   Kerr et al.
(Continued)

FOREIGN PATENT DOCUMENTS

CN    1449601 A    10/2003
CN    1475064 A    2/2004
(Continued)

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.
(Continued)

*Primary Examiner* — Kan Yuen
(74) *Attorney, Agent, or Firm* — Rupit M. Patel

(57) ABSTRACT

Techniques for mapping applications to radios in a wireless communication device are described. In one design, a controller residing below an operating system may receive inputs from applications residing above the operating system. The controller may determine radios selected based on the application inputs and further to mitigate interference between these radios. The controller may determine mapping of the applications to the radios based on the application inputs and may provide, to the applications, information indicative of the radios to which the applications are mapped. The applications may obtain connectivity via their selected radios. The controller may interface with entities in both upper layers and lower layers to facilitate radio selection and application-to-radio mapping. The controller may control the operation of a connection manager and/or a coexistence manager, manage databases for these managers, provide CPU and memory resources for these managers, manage a data bus used for communication, etc.

30 Claims, 5 Drawing Sheets

(51) Int. Cl.
*H04W 48/18* (2009.01)
*H04W 88/06* (2009.01)

(56) References Cited

U.S. PATENT DOCUMENTS

| | | |
|---|---|---|
| 5,726,893 A | 3/1998 | Schuchman et al. |
| 6,128,483 A | 10/2000 | Doiron et al. |
| 6,571,285 B1 | 5/2003 | Groath et al. |
| 6,944,430 B2 | 9/2005 | Berstis |
| 7,035,314 B1 | 4/2006 | Linsky |
| 7,146,133 B2 * | 12/2006 | Bahl et al. .................... 455/63.1 |
| 7,317,900 B1 | 1/2008 | Linde et al. |
| 7,324,815 B2 | 1/2008 | Ross et al. |
| 7,339,446 B2 | 3/2008 | Su et al. |
| 7,412,250 B2 | 8/2008 | Fukuda |
| 7,433,970 B1 | 10/2008 | Euler et al. |
| 7,440,728 B2 | 10/2008 | Abhishek et al. |
| 7,454,171 B2 | 11/2008 | Palin et al. |
| 7,623,879 B2 | 11/2009 | Honkanen et al. |
| 7,685,325 B2 | 3/2010 | Batchelor et al. |
| 7,786,755 B2 | 8/2010 | Yao et al. |
| 7,903,642 B2 | 3/2011 | Voutilainen et al. |
| 7,929,432 B2 | 4/2011 | Zhu et al. |
| 7,990,882 B1 * | 8/2011 | Bedair et al. ................... 370/252 |
| 7,990,992 B2 | 8/2011 | Muukki et al. |
| 8,059,553 B2 | 11/2011 | Leung et al. |
| 8,060,085 B2 | 11/2011 | Goulder et al. |
| 8,089,888 B2 | 1/2012 | Krishnamurthi et al. |
| 8,095,176 B2 | 1/2012 | Sudak |
| 8,184,154 B2 | 5/2012 | Estevez et al. |
| 8,340,706 B2 | 12/2012 | Zetterman et al. |
| 8,660,548 B1 | 2/2014 | Lambert |
| 8,903,314 B2 | 12/2014 | Linsky |
| 2002/0080728 A1 | 6/2002 | Sugar et al. |
| 2002/0129184 A1 | 9/2002 | Watanabe |
| 2002/0167963 A1 | 11/2002 | Joa-Ng |
| 2003/0135675 A1 | 7/2003 | Pontius et al. |
| 2003/0139136 A1 | 7/2003 | Pattabiraman |
| 2003/0231741 A1 | 12/2003 | Rancu et al. |
| 2004/0022210 A1 | 2/2004 | Frank et al. |
| 2004/0023674 A1 | 2/2004 | Miller |
| 2004/0028003 A1 | 2/2004 | Diener et al. |
| 2004/0028123 A1 | 2/2004 | Sugar et al. |
| 2004/0029619 A1 | 2/2004 | Liang et al. |
| 2004/0052272 A1 | 3/2004 | Frank |
| 2004/0137915 A1 | 7/2004 | Diener et al. |
| 2004/0192222 A1 | 9/2004 | Vaisanen et al. |
| 2004/0259589 A1 | 12/2004 | Bahl et al. |
| 2005/0047038 A1 | 3/2005 | Nakajima et al. |
| 2005/0099943 A1 | 5/2005 | Naghian et al. |
| 2005/0239497 A1 | 10/2005 | Bahl et al. |
| 2005/0277387 A1 | 12/2005 | Kojima et al. |
| 2005/0289092 A1 | 12/2005 | Sumner et al. |
| 2006/0013176 A1 | 1/2006 | De Vos et al. |
| 2006/0025181 A1 | 2/2006 | Kalofonos et al. |
| 2006/0026051 A1 | 2/2006 | Rose |
| 2006/0089119 A1 | 4/2006 | Lipasti et al. |
| 2006/0101033 A1 | 5/2006 | Hu et al. |
| 2006/0126702 A1 | 6/2006 | Burdett |
| 2006/0152335 A1 | 7/2006 | Helgeson |
| 2006/0160563 A1 | 7/2006 | Ku |
| 2006/0166628 A1 | 7/2006 | Anttila |
| 2006/0233191 A1 * | 10/2006 | Pirzada et al. .................. 370/463 |
| 2006/0292986 A1 | 12/2006 | Bitran et al. |
| 2007/0105548 A1 | 5/2007 | Mohan et al. |
| 2007/0124005 A1 | 5/2007 | Bourakov et al. |
| 2007/0125162 A1 | 6/2007 | Ghazi et al. |
| 2007/0135162 A1 | 6/2007 | Banerjea et al. |
| 2007/0153702 A1 | 7/2007 | Khan Alicherry et al. |
| 2007/0165754 A1 | 7/2007 | Kiukkonen et al. |
| 2007/0206631 A1 | 9/2007 | Parts et al. |
| 2007/0232349 A1 | 10/2007 | Jones et al. |
| 2007/0248114 A1 | 10/2007 | Jia et al. |
| 2007/0255850 A1 | 11/2007 | Gould et al. |
| 2007/0281617 A1 | 12/2007 | Meylan et al. |
| 2008/0019339 A1 * | 1/2008 | Raju et al. .................... 370/338 |
| 2008/0045152 A1 | 2/2008 | Boes |
| 2008/0057910 A1 | 3/2008 | Thoresson et al. |
| 2008/0066019 A1 | 3/2008 | Worek et al. |
| 2008/0109581 A1 | 5/2008 | Pham et al. |
| 2008/0130580 A1 | 6/2008 | Chaponniere et al. |
| 2008/0161041 A1 | 7/2008 | Pernu |
| 2008/0192806 A1 | 8/2008 | Wyper et al. |
| 2008/0200120 A1 | 8/2008 | Ruuska et al. |
| 2008/0227456 A1 | 9/2008 | Huang et al. |
| 2008/0232339 A1 | 9/2008 | Yang et al. |
| 2008/0254745 A1 | 10/2008 | Zhang et al. |
| 2008/0279137 A1 | 11/2008 | Pernu et al. |
| 2008/0279155 A1 | 11/2008 | Pratt, Jr. et al. |
| 2008/0287158 A1 | 11/2008 | Rayzman et al. |
| 2008/0298643 A1 | 12/2008 | Lawther et al. |
| 2008/0311912 A1 | 12/2008 | Balasubramanian et al. |
| 2009/0033550 A1 | 2/2009 | Wolf |
| 2009/0040937 A1 | 2/2009 | Xhafa et al. |
| 2009/0046625 A1 | 2/2009 | Diener et al. |
| 2009/0061781 A1 | 3/2009 | Zhang |
| 2009/0116437 A1 | 5/2009 | Alexandre et al. |
| 2009/0116573 A1 | 5/2009 | Gaal et al. |
| 2009/0137206 A1 | 5/2009 | Sherman et al. |
| 2009/0149135 A1 | 6/2009 | Mangold et al. |
| 2009/0176454 A1 | 7/2009 | Chen et al. |
| 2009/0180451 A1 | 7/2009 | Alpert et al. |
| 2009/0196210 A1 | 8/2009 | Desai |
| 2009/0215404 A1 | 8/2009 | Kesavan et al. |
| 2009/0239471 A1 | 9/2009 | Tran et al. |
| 2009/0252053 A1 | 10/2009 | Leith et al. |
| 2009/0252128 A1 | 10/2009 | Yang et al. |
| 2009/0257380 A1 | 10/2009 | Meier |
| 2009/0262785 A1 | 10/2009 | Wilhelmsson |
| 2009/0303975 A1 | 12/2009 | Xhafa et al. |
| 2009/0310501 A1 | 12/2009 | Catovic et al. |
| 2009/0310661 A1 | 12/2009 | Kloper et al. |
| 2009/0323652 A1 * | 12/2009 | Chen et al. .................... 370/338 |
| 2010/0085951 A1 | 4/2010 | Pernu et al. |
| 2010/0130129 A1 | 5/2010 | Chang et al. |
| 2010/0137025 A1 | 6/2010 | Tal et al. |
| 2010/0141399 A1 | 6/2010 | Swope |
| 2010/0142500 A1 | 6/2010 | Sudak |
| 2010/0153760 A1 | 6/2010 | Gupta et al. |
| 2010/0158037 A1 | 6/2010 | Heinke et al. |
| 2010/0197235 A1 | 8/2010 | Wilhelmsson |
| 2010/0203832 A1 | 8/2010 | Russell et al. |
| 2010/0241727 A1 * | 9/2010 | Bourakov et al. ............. 709/217 |
| 2010/0273426 A1 | 10/2010 | Walley et al. |
| 2010/0273504 A1 | 10/2010 | Bull et al. |
| 2010/0304685 A1 | 12/2010 | Wietfeldt et al. |
| 2010/0304770 A1 | 12/2010 | Wietfeldt et al. |
| 2010/0311455 A1 | 12/2010 | Armstrong et al. |
| 2010/0316027 A1 | 12/2010 | Rick et al. |
| 2010/0322287 A1 | 12/2010 | Truong et al. |
| 2010/0329161 A1 | 12/2010 | Ylanen et al. |
| 2010/0329162 A1 | 12/2010 | Kadous et al. |
| 2010/0330977 A1 | 12/2010 | Kadous et al. |
| 2010/0331029 A1 | 12/2010 | Linsky et al. |
| 2011/0007680 A1 | 1/2011 | Kadous et al. |
| 2011/0007688 A1 | 1/2011 | Veeravalli et al. |
| 2011/0009136 A1 | 1/2011 | Mantravadi et al. |
| 2011/0026432 A1 | 2/2011 | Gruber et al. |
| 2011/0026458 A1 | 2/2011 | Gruber et al. |
| 2011/0065402 A1 | 3/2011 | Kraft et al. |
| 2011/0105027 A1 | 5/2011 | Linsky |
| 2011/0116490 A1 | 5/2011 | Wilhelmsson et al. |
| 2011/0212288 A1 | 9/2011 | McClure et al. |
| 2011/0249603 A1 | 10/2011 | Rick et al. |
| 2011/0312288 A1 | 12/2011 | Fu et al. |
| 2011/0317565 A1 | 12/2011 | Krishnamurthi et al. |
| 2012/0034870 A9 | 2/2012 | Desai |
| 2012/0129457 A1 | 5/2012 | Linsky |
| 2012/0213303 A1 | 8/2012 | Kadous et al. |

(56) References Cited

U.S. PATENT DOCUMENTS

| | | |
|---|---|---|
| 2012/0230303 A1 | 9/2012 | Guo et al. |
| 2012/0270595 A1 | 10/2012 | Yang et al. |

FOREIGN PATENT DOCUMENTS

| | | |
|---|---|---|
| CN | 1592088 A | 3/2005 |
| CN | 1666189 A | 9/2005 |
| CN | 1689194 A | 10/2005 |
| CN | 1716900 A | 1/2006 |
| CN | 1741484 A | 3/2006 |
| CN | 1887018 A | 12/2006 |
| CN | 1893299 A | 1/2007 |
| CN | 101132368 A | 2/2008 |
| CN | 101170315 A | 4/2008 |
| CN | 101262254 A | 9/2008 |
| CN | 101361279 A | 2/2009 |
| CN | 101378355 A | 3/2009 |
| CN | 101453759 A | 6/2009 |
| DE | 19602535 C1 | 9/1996 |
| EP | 1220460 A2 | 7/2002 |
| EP | 1489788 A2 | 12/2004 |
| EP | 1551080 A1 | 7/2005 |
| EP | 1589781 | 10/2005 |
| EP | 1659814 A1 | 5/2006 |
| EP | 1681772 A1 | 7/2006 |
| EP | 1703675 A1 | 9/2006 |
| EP | 1705936 | 9/2006 |
| EP | 1729464 A1 | 12/2006 |
| EP | 1959619 | 8/2008 |
| EP | 2068452 | 6/2009 |
| GB | 2412817 A | 10/2005 |
| JP | S61110250 A | 5/1986 |
| JP | H05336141 A | 12/1993 |
| JP | H0721114 A | 1/1995 |
| JP | 08055495 | 2/1996 |
| JP | 9501814 A | 2/1997 |
| JP | 2003199160 A | 7/2003 |
| JP | 2003234745 A | 8/2003 |
| JP | 2003298598 A | 10/2003 |
| JP | 2004129143 A | 4/2004 |
| JP | 2005012815 A | 1/2005 |
| JP | 2005529549 A | 9/2005 |
| JP | 2005328520 A | 11/2005 |
| JP | 2006211242 A | 8/2006 |
| JP | 2007503733 A | 2/2007 |
| JP | 2007129711 A | 5/2007 |
| JP | 2007202176 A | 8/2007 |
| JP | 2007523519 A | 8/2007 |
| JP | 2008521309 A | 6/2008 |
| JP | 2008153984 A | 7/2008 |
| JP | 2008219444 A | 9/2008 |
| JP | 2009042887 A | 2/2009 |
| JP | 2009534972 A | 9/2009 |
| JP | 2010504677 A | 2/2010 |
| JP | 2010531565 A | 9/2010 |
| KR | 20040111157 A | 12/2004 |
| KR | 20060047429 A | 5/2006 |
| TW | I264209 B | 10/2006 |
| TW | I309953 B | 5/2009 |
| WO | WO9422239 | 9/1994 |
| WO | 9527381 A1 | 10/1995 |
| WO | WO0230133 A2 | 4/2002 |
| WO | WO03105418 | 12/2003 |
| WO | WO2004006461 A1 | 1/2004 |
| WO | WO-2005062815 A2 | 7/2005 |
| WO | WO2007008981 | 1/2007 |
| WO | 2007063901 A1 | 6/2007 |
| WO | WO-2007083205 A2 | 7/2007 |
| WO | 2007122297 A1 | 11/2007 |
| WO | WO2007138375 | 12/2007 |
| WO | WO2008000905 | 1/2008 |
| WO | 2008024713 A2 | 2/2008 |
| WO | 2008041071 A2 | 4/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011008557 A1 | 1/2011 |
| WO | WO2011061164 A2 | 5/2011 |

OTHER PUBLICATIONS

Bluetooth Sig, Inc. "Bluetooth Specification Version 3.0 + HS, Core System Package, Part B Baseband Specification", vol. 2 Apr. 21, 2009, pp. 68-85, XP002622397, Retrieved from the Internet: URL: http://www.bluetooth.com/Specification %20Documents/Core_V30_HS.zip.

Coen Bron, et al., Algorithm 457: Finding All Cliques of an Undirected Graph, Communications of the ACM, 16(9): 575-577, 1973.

F. Cazals, C. Karande, A note on the problem of reporting maximal cliques, Theoretical Computer Science, vol. 407, Issues 1-3, Nov. 6, 2008, pp. 564-568.

Hong, et al., "Exploring multiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP011311811, ISSN: 1536-1284.

International Search Report and Written Opinion—PCT/US2010/045930, International Search Authority—European Patent Office—Dec. 6, 2010.

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, et al., "Interference-Aware Channel Assignment in Multi-Radio Wireless Mesh Networks", INFOCOM 2006, 25th IEEE International Conference on Computer Communications, Proceedings, IEEE Piscataway, NJ, Apr. 1, 2006, pp. 1-12, XP031072217, DOI: 10.1109/INFOCOM.2006.177, ISBN: 978-1-4244-0221-2.

Stefan Geirhofer, et al., "Cognitive frequency hopping based on interference prediction: theory and experimental results" Mobile Computing and Communications Review, ACM, New York, NY, US LNKD-DOI: 10.1145/1621076.1621082, vol. 13, No. 2, Apr. 1, 2009, pp. 49-61, XP001555779, ISSN: 1091-1669.

dB or not dB? Everything you ever wanted to know about decibels but were afraid to ask . . . Application Note 1 MA98, Oct. 2005, Rohde & Schwarz, located at http:llwww2.rohde-schwarz.comlfile~561311MA98-4E.

Taiwan Search Report—TW099117627—TIPO—Apr. 7, 2013.

Stefan, G., et al., "Congnitive Frequency Hopping Based on Interference Prediction: Theory and Experimental Results", Mobile Computing and Communications Review, vol. 13, No. 2, pp. 49 to 51, Apr. 2009.

Taiwan Search Report—TW099127618—TIPO—Jun. 7, 2013.

* cited by examiner

METHOD AND APPARATUS FOR MAPPING APPLICATIONS TO RADIOS IN A WIRELESS COMMUNICATION DEVICE

The present application claims priority to provisional U.S. Application Ser. No. 61/234,941, entitled "SPS AS COEXISTENCE MANAGER CONTROLLER," filed Aug. 18, 2009, assigned to the assignee hereof and incorporated herein by reference.

BACKGROUND

I. Field

The present disclosure relates generally to communication, and more specifically to techniques for supporting communication by a wireless communication device.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication device may include a number of radios to support communication with different wireless communication networks. The wireless device may also support a number of applications, which may have different requirements. It may be desirable to support communication for active applications on the wireless device such that good performance can be achieved.

SUMMARY

Techniques for mapping applications to radios in a wireless communication device are described herein. In an aspect, a controller may support (i) selection of radios that can operate concurrently without causing excessive interference to one another and (ii) mapping of applications to the radios. The controller may reside below an operating system in the wireless device and may provide various advantages, as described below.

In one design, the controller may receive inputs from multiple applications, which may reside above the operating system. The controller may obtain interference information for a plurality of radios. The controller may determine multiple radios selected based on the inputs from the applications and based further on the interference information to mitigate interference between these radios. The controller may determine mapping of the applications to the radios based on the inputs from the applications. The radios may be selected and/or the applications may be mapped to the radios based further on requirements of the applications, preferences of the applications, priorities of the applications, and/or other information. The controller may provide to the applications information indicative of the radios to which the applications are mapped. The applications may then obtain connectivity via their selected radios.

In one design, the controller may interface with entities in both upper layers and lower layers to facilitate radio selection and application-to-radio mapping. The controller may communicate with entities (e.g., applications) in the upper layers to obtain requirements, preferences, and/or priorities of the applications. The controller may communicate with entities (e.g., radio controllers) in the lower layers to obtain capabilities and/or status of the radios. The applications may be mapped to the radios based on the requirements, preferences, and/or priorities of the applications and the capabilities and/or status of the radios. The controller may support real-time interaction with the applications and radios.

In one design, the controller may control the operation of other entities to support radio selection and application-to-radio mapping. The controller may control the operation of a connection manager, which may be designated to select radios for applications and/or to map applications to radios. The controller may also control the operation of a coexistence manager, which may be designated to control the operation of radios to mitigate interference between the radios.

The controller may also perform other functions to support connection management and/or coexistence management. The controller may manage databases for the connection manager and the coexistence manager. The controller may manage a data bus used for communication between the controller, the connection manager, and the coexistence manager. The controller may provide central processing unit (CPU) resources, memory resources, and/or other resources for the connection manager and/or the coexistence manager. The controller may also perform other functions to support connection management and/or coexistence management.

Various aspects and features of the disclosure are described in further detail below.

BRIEF DESCRIPTION OF THE DRAWINGS

FIG. 3 shows a call flow for initialization when the wireless device is turned on.

DETAILED DESCRIPTION

Figure 1:
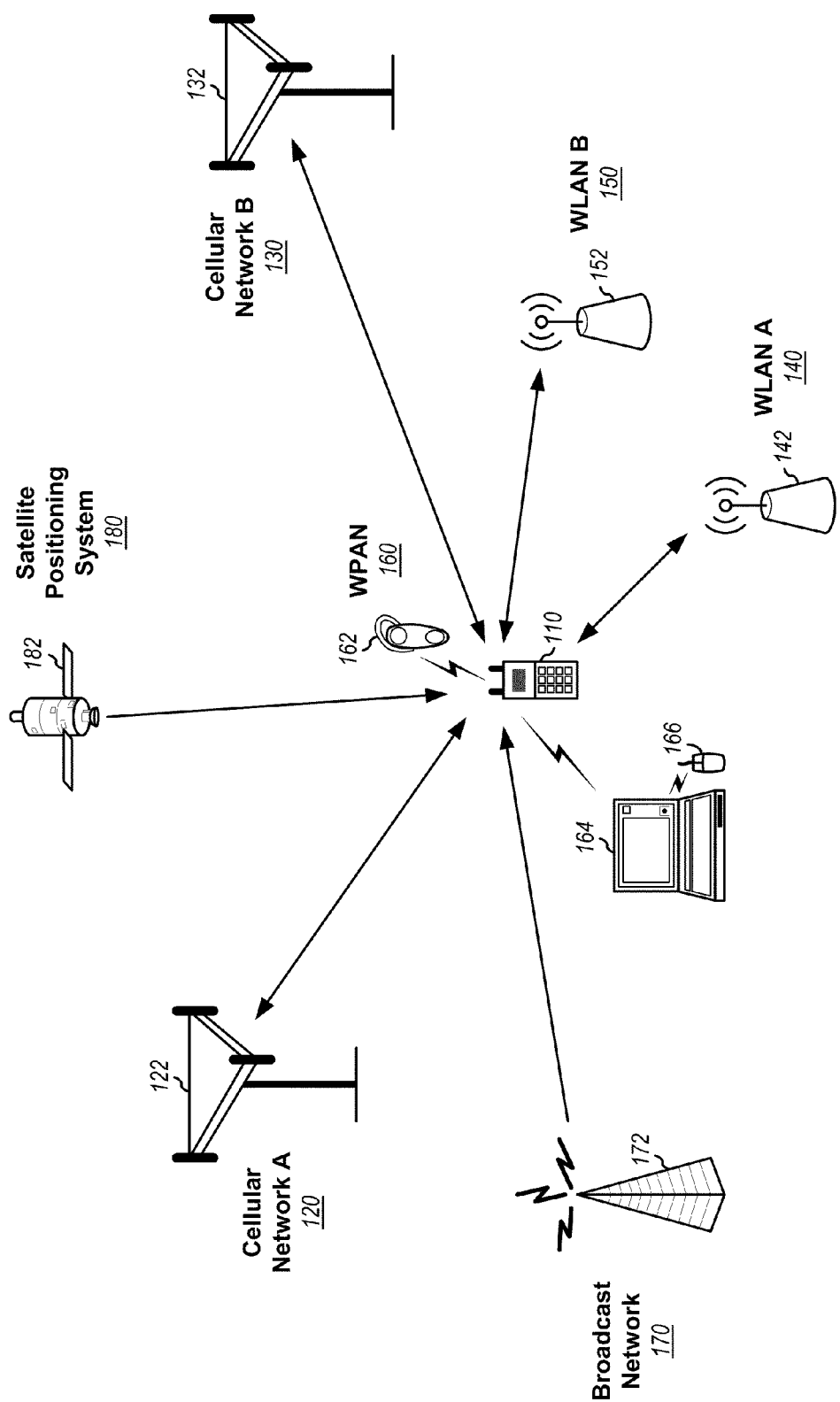
FIG. 1 shows a wireless device communicating with various wireless networks.

FIG. 1 shows a wireless communication device 110 capable of communicating with multiple wireless communication networks. These wireless networks may include one or more wireless wide area networks (WWANs) 120 and 130, one or more wireless local area networks (WLANs) 140 and 150, one or more wireless personal area networks (WPANs) 160, one or more broadcast networks 170, one or more satellite positioning systems 180, other networks and systems not shown in FIG. 1, or any combination thereof. The terms "network" and "system" are often used interchangeably. The WWANs may be cellular networks.

Cellular networks 120 and 130 may each be a CDMA, TDMA, FDMA, OFDMA, SC-FDMA, or some other network. A CDMA network may implement a radio technology or air interface such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. IS-2000 is also referred to as CDMA 1X, and IS-856 is also referred to as Evolution-Data Optimized (EVDO). A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2". Cellular networks 120 and 130 may include base stations 122 and 132, respectively, which can support bi-directional communication for wireless devices.

WLANs 140 and 150 may each implement a radio technology such as IEEE 802.11 (Wi-Fi), Hiperlan, etc. WLANs 140 and 150 may include access points 142 and 152, respectively, which can support bi-directional communication for wireless devices. WPAN 160 may implement a radio technology such as Bluetooth, IEEE 802.15, etc. WPAN 160 may support bi-directional communication for various devices such as wireless device 110, a headset 162, a computer 164, a mouse 166, etc.

Broadcast network 170 may be a television (TV) broadcast network, a frequency modulation (FM) broadcast network, a digital broadcast network, etc. A digital broadcast network may implement a radio technology such as MediaFLO™, Digital Video Broadcasting for Handhelds (DVB-H), Integrated Services Digital Broadcasting for Terrestrial Television Broadcasting (ISDB-T), Advanced Television Systems Committee-Mobile/Handheld (ATSC-M/H), etc. Broadcast network 170 may include one or more broadcast stations 172 that can support one-way communication.

Satellite positioning system 180 may be the United States Global Positioning System (GPS), the European Galileo system, the Russian GLONASS system, the Japanese Quasi-Zenith Satellite System (QZSS), the Indian Regional Navigational Satellite System (IRNSS), the Chinese Beidou system, etc. Satellite positioning system 180 may include a number of satellites 182 that transmit signals used for positioning.

Wireless device 110 may be stationary or mobile and may also be referred to as a user equipment (UE), a mobile station, a mobile equipment, a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, a smart phone, a netbook, a smartbook, a broadcast receiver, etc. Wireless device 110 may communicate two-way with cellular networks 120 and/or 130, WLANs 140 and/or 150, devices within WPAN 160, etc. Wireless device 110 may also receive signals from broadcast network 170, satellite positioning system 180, etc. In general, wireless device 110 may communicate with any number of wireless networks and systems at any given moment.

Figure 2:
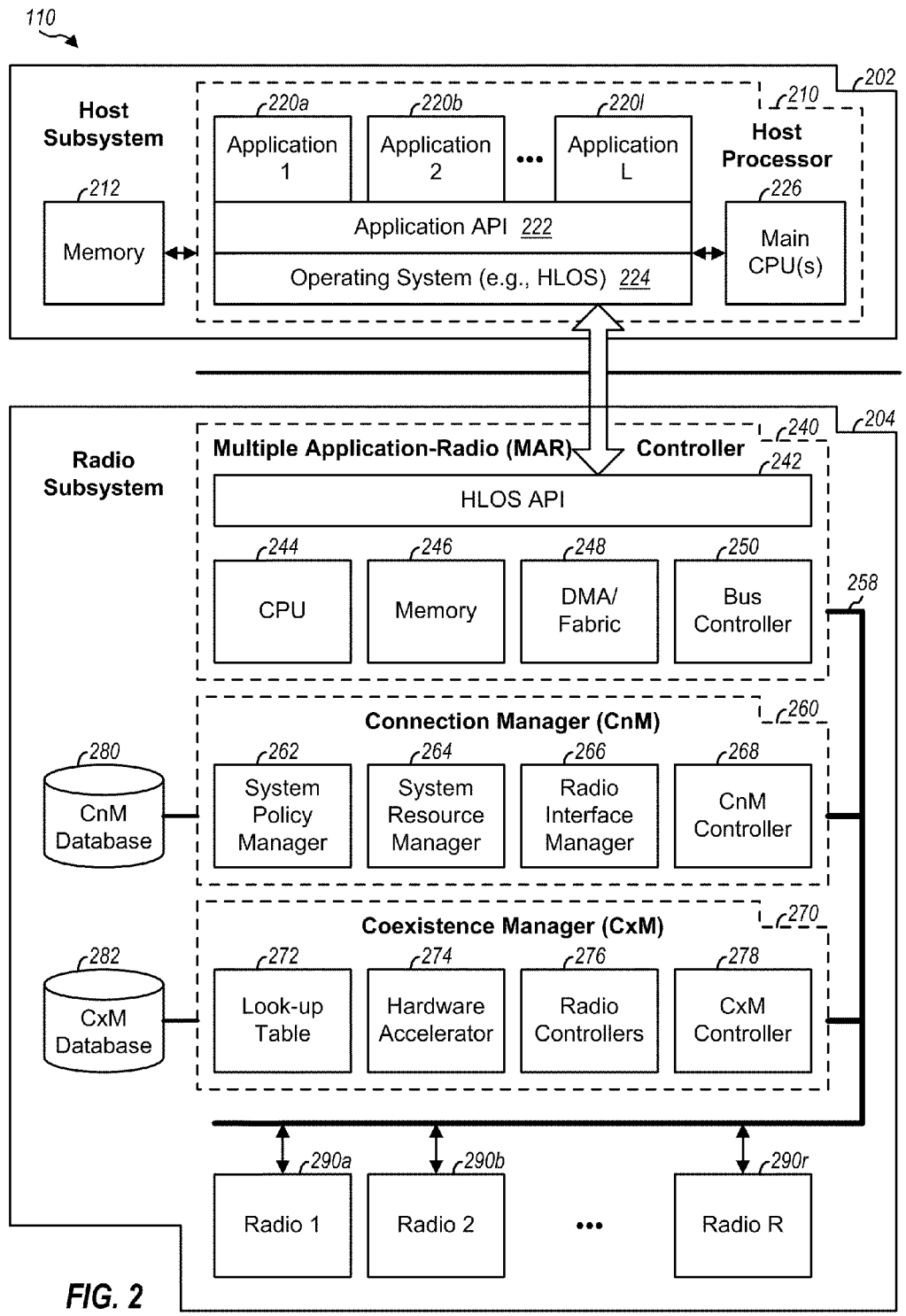
FIG. 2 shows a block diagram of the wireless device.

FIG. 2 shows a block diagram of a design of wireless device 110, which includes a host subsystem 202 and a radio subsystem 204. Host subsystem 202 supports various applications and functions for wireless device 110. Radio subsystem 204 supports radio communication for wireless device 110.

In the design shown in FIG. 2, host subsystem 202 includes a host processor 210 and a memory 212. Wireless device 110 may support L applications 220a through 220l, which may provide different communication services such as voice, packet data, video share, video telephony, email, broadcast reception, instant messaging, push-to-talk, etc. In general, L may be any value. Any one of the L applications 220 may be active at any given moment. An application programming interface (API) 222 may support communication between applications 220 and an operating system (OS) 224 for wireless device 110. Operating system 224 may control the operation of wireless device 110 and may be a high level operating system (HLOS) or some other operating system. Host processor 210 may execute active applications 220 and may also run application API 222 and OS 224. One or more main CPUs 226 may perform processing for active applications 224 and other functions. Memory 212 may store program codes and data for host processor 210.

In the design shown in FIG. 2, radio subsystem 204 includes a multiple application-radio (MAR) controller 240, a connection manager (CnM) 260, a coexistence manager (CxM) 270, a CnM database 280, a CxM database 282, and R radios 290a through 290r, where R may be any value. MAR controller 240 may also be referred to as a smart peripheral system (SPS) controller, etc. Radio subsystem 204 may be a modem chip, a modem chipset, a wireless data card, etc. The R radios 290 may be for 3GPP2 cellular networks (e.g., CDMA 1X, EVDO, etc.), 3GPP cellular networks (e.g., GSM, GPRS, EDGE, WCDMA/UMTS, LTE, etc.), WLANs, WiMAX networks, GPS, Bluetooth, broadcast networks, Near Field Communication (NFC), Radio Frequency Identification (RFID), etc.

MAR controller 240 may provide control functions and resources for other units within radio subsystem 204. MAR controller 240 may communicate with applications 220 via APIs to determine which applications are active, obtain the requirements of the active applications, and provide information on the available or selected radios. Within MAR controller 240, a HLOS API 242 may facilitate communication between MAR controller 240 and applications 220, as described below. A CPU 244 may perform processing for MAR controller 240, connection manager 260, and coexistence manager 270. CPU 244 may also perform processing for data being transmitted and/or received via radios 290. The processing for each radio 290 may be dependent on the radio technology supported by that radio and may include encoding, decoding, modulation, demodulation, encryption, decryption, etc. Memory 246 may store program code and data for MAR controller 240, connection manager 260, and coexistence manager 270. A direct memory access (DMA)/fabric controller 248 may support data transfer with local or external memory or other subsystems. A bus controller 250 may coordinate communication via a data bus 258, which may be a synchronous or asynchronous bus. Bus controller 250 may manage clock generation and sleep components of data bus 258 and may also manage unicast and broadcast communication with the connected radios. Bus controller 250 may also coordinate communication between radio subsystem 204 and other entities within wireless device 110, e.g., via one or more other buses not shown in FIG. 2.

In one design, MAR controller 240 may perform processing for connection manager 260 and coexistence manager 270, e.g., for functions related to radio selection, system selection, handoff between radios, etc. System selection may refer to selection of a particular wireless system, or a particular radio technology, or a particular family of radio technologies. Radio selection may refer to selection of a particular radio in wireless device 100. CPU 244 may be an embedded processor located within radio subsystem 204. CPU 244 and associated memory 246 can provide a single and centralized environment to host CnM and CxM functions. This may enable connection manager 260 to provide real-time management of all active radios in a localized environment. This may also enable connection manager 260 to provide a scalable infrastructure to support any number of radios. CPU 244 may be a low-power processor with lower required performance than conventional CPUs in order to provide power savings in executing CxM and CnM functions. Furthermore, CPU 244 may provide an "always on" environment so that connection manager 260 and coexistence manager 270 can be functional when needed. This "always on" functionality may be assured while simultaneously enabling CPU 244 to sleep when appropriate in order to reduce power consumption.

Connection manager 260 may perform various functions to support communication for active applications via available radios. Within connection manager 260, a system policy manager 262 may manage policies associated with radios 290, activate and de-activate radios in response to events, and manage handoffs between wireless networks. The policies may be used to determine which radio(s) to use for any given application. System policy manager 262 may operate based on network operator rules, which may be provided via a preferred roaming list (PRL) in 3GPP2, a list of preferred public land mobile networks (PLMNs) in 3GPP, etc. A system resource manager 264 may interface with system policy manager 262 to perform resource management such as conflict resolution, power management, link quality of service (QoS), admission control, etc. A radio interface manager 266 may manage call, change phone settings, register/de-register supplementary services, and notify applications regarding call status, phone state/status, and service status. Radio interface manager 266 may also manage service continuity using Mobile Internet Protocol (MIP), neighbor channel measurements, better system detection, pre-authentication and security key exchange, and other functional units for voice and data services. Radio interface manager 266 may also support peer-to-peer communication between wireless device 110 and other wireless devices. A CnM controller 268 may be responsible for the overall control of connection manager 260 and may also coordinate the operation of other managers and controllers within connection manager 260, e.g., through messages exchanged via data bus 258.

Coexistence manager 270 may interface with radios 290 and may control the operation of the radios. Coexistence manager 270 may receive inputs from active radios and may control the operation of the active radios to mitigate interference between these radios and achieve good performance for as many radios as possible. Within coexistence manager 270, a CxM controller 278 may be responsible for the overall control of coexistence manager 270. Radio controllers 276 may interface with radios 290 and may control the operation of the radios. Radio controllers 276 may be part of coexistence manager 270 (as shown in FIG. 2) or may be external to coexistence manager 270 (e.g., may be part of radios 290). Radio controllers 276 may perform functions to support voice call continuity (VCC) and data call continuity (DCC). Radio controllers 276 may also implement handoff mechanism for voice call continuity between a circuit-switched network and a packet-switched network. Radio controllers 276 may also implement handoff mechanism for (i) data service continuity defined in 3GPP I-WLAN and (ii) Mobile IP defined in 3GPP and Internet Engineering Task Force (IETF). Radio controllers 276 may support VCC and DCC functionalities for automatic system selection and in-call/in-use handoff between radios of different radio technologies in order to maintain good user experience. A look-up table (LUT) 272 may be associated with (and may interface with) CxM database 282 to retrieve pertinent parts of the database based on the current operating scenario. A hardware accelerator (HWA) 274 may provide efficient processing of certain functions.

CnM database 280 may store various information that may be used to select radios for applications. In one design, CnM database 280 may store one or more of the following:

A network database of information for different wireless networks,

A policy database of information used to select radios to provide connectivity for wireless device 110, A profile database of profiles that may be used to obtain connectivity, A services database of service clients that have been downloaded onto wireless device 110, A converted interference database of information used to select radios for applications based on the current operating scenario, and Other databases of other information for wireless device 110.

The profile database may store various profiles that may be used to provide connectivity for wireless device 110. A profile may contain preferences for specific actions that wireless device 110 should perform to obtain connectivity. For example, a profile may identify preferences for certain radios over other radios, preferences for a particular radio under certain conditions, etc. Different profiles may be defined by different entities to allow for conformance to the requirements of these entities. In one design, one or more of the following profiles may be defined:

User profile—store preferences for connectivity defined by a user, e.g., based on various considerations such as cost, privacy, battery usage, etc., Operator profile—store connectivity preferences defined by a network operator, e.g., via a PRL, a preferred PLMN list, etc.

Original equipment manufacturer (OEM) profile—store connectivity preferences defined by an OEM, e.g., based on capabilities of wireless device 110, Applications profile—store connectivity preferences for applications 220, e.g., defined based on requirements of the applications, Services profile—store connectivity preferences for auxiliary services, and Learned profile—store connectivity preferences determined based on learned patterns and behavior of wireless device 110.

CxM database 282 may store an interference database, which may comprise information on performance of different combinations of radios in different operating scenarios. The interference database may be in the form of a color chart. In one design, the color chart may include (i) a number of columns for different transmitter radios at different frequency bands and (ii) a number of rows for different receiver radios at different frequency bands. For a given band combination at an intersection between a column and a row, the performance of a receiver radio at a frequency band for that row in the presence of a transmitter radio at a frequency band for that column may be stored in the color chart.

In another design, the color chart may include a number of cells/entries for a number of operating states for different transmitter and receiver radios. A radio may have one or more configurable parameters that may be adjusted to mitigate interference from the radio and/or to improve the performance of the radio. Each configurable parameter may be set to one of multiple possible settings/values applicable for that parameter. The radio may have an operating state, which may be defined by a particular setting for each configurable parameter. The color chart may include a set of columns for each frequency channel on which a transmitter radio can operate, and each column may correspond to a different operating state of the transmitter radio. The color chart may also include a set of rows for each frequency channel on which a receiver radio can operate, and each row may correspond to a different operating state of the receiver radio. A cell/entry may be defined for each unique combination of operating states of the transmitter and receiver radios. Cell (i, j) may be filled with the performance level (e.g., acceptable, marginal, or unacceptable) of the receiver radio with the transmitter radio in operating state i and the receiver radio in operating state j. The operating state of the transmitter radio and/or the operating state of the receiver radio may be varied, as needed, to obtain the desired performance.

Information regarding interference between radios may also be captured and presented in other manners, e.g., quantized in other ways, presented using other formats or structures, etc. In any case, the interference database in CxM database 282 may be used to select radios that can operate concurrently. The operation of radios may also be controlled based on the interference database to reduce interference between the radios and obtain acceptable performance for the radios. In one design, the interference database may be updated frequently (e.g., every millisecond or less) based on the current interference conditions. In one design, the interference database may be converted to a converted interference database, which may be simpler to use for radio selection for initial connection and/or handoff. The conversion may include (i) filtering interference conditions for radios with a suitable time constant to obtain a more accurate indication of the interference conditions observed by the radios, (ii) changing from one format (e.g., with decibel (dB) values) to another format (e.g., with color coded indicators), and/or (iii) other operations on the interference information.

FIG. 2 shows an exemplary design of radio subsystem 204, MAR controller 240, connection manager 260, and coexistence manager 270 for wireless device 110. Radio subsystem 204, MAR controller 240, connection manager 260, and coexistence manager 270 may also include fewer, different, and/or additional managers, controllers, and databases. In general, radio subsystem 204 may include (i) any number of managers and controllers for any number of functions and (ii) any number of databases for any type of information that may be useful to support communication.

In one design, MAR controller 240 may perform or support one or more of the following functions:
 Act as a master controller of connection manager 260 and coexistence manager 270,
 Manage CnM database 280 and CxM database 282,
 Manage data bus 258,
 Communicate with upper/higher layers HLOS and applications as well as lower layer radios and/or their controllers,
 Provide CPU, memory, and bus resources, and
 Perform other functions.

The various functions of MAR controller 240 are described in detail below.

In one design, MAR controller 240 may be an overall/master controller for connection manager 260 and coexistence manager 270. MAR controller 240 may manage CnM functions of mapping active applications 220 to active radios 290, including functions of receiving requirements of applications 220. MAR controller 240 may also manage CxM functions of mitigating interference among active radios 290 and may aid CnM controller 268 in selecting appropriate radios for active applications 220.

In one design, connection manager 260 may perform various functions to map applications 220 to radios 290. Coexistence manager 270 may perform various functions to mitigate interference between active radios 290. Connection manager 260 and coexistence manager 270 may have dedicated controllers 268 and 278, respectively, to serve their own internal functions. CnM controller 268 may manage CnM functions autonomously, and CxM controller 278 may also manage CxM functions autonomously. MAR controller 240 may serve as a broker for CnM controller 268 and CxM controller 278. MAR controller 240 may also provide system-on-chip (SOC) infrastructure via CPU 244, memory 246, DMA/fabric 248, and bus controller 250. Connection manager 260 and coexistence manager 270 may be able to operate without MAR controller 240. For example, connection manager 260 may operate with an HLOS CnM application, and coexistence manager 270 may operate with an HLOS CxM application. However, connection manager 260 and coexistence manager 270 may then have limited capabilities and may be restricted to static or semi-static operation. MAR controller 240 may support dynamic, concurrent, and real-time operation of connection manager 260 and coexistence manager 270 and may support priorities among the managers as indicated in the profile database.

In one design, MAR controller 240 may manage transport of control and data for connection manager 260 and coexistence manager 270. MAR controller 240 may replace and offload any main system control processor involvement from managers 260 and 270, which may create heavy communications load, power consumption, and stalled system operations. MAR controller 240 may be configured during power up and may free up main system processor (e.g., CPU(s) 226) and resources for the tasks of connection management and coexistence management.

In one design, MAR controller 240 may enable concurrent operation of multiple entities for connection management, including priorities among entities, e.g., as indicated in the profile database. For example, MAR controller 240 may support concurrent operation of a CnM entity within HLOS 224 and an embedded CnM entity. As another example, MAR controller 240 may support concurrent operation of multiple (e.g., two) embedded CnM entities, based on different operating rules, as defined in the profile database (e.g., CnM entities for different users, for business versus personal, etc.).

In one design, MAR controller 240 may communicate with "upper layers" and "lower layers" in a stack in wireless device 110. The upper layers may include HLOS 224, applications 220, and/or other applications related to connection management and coexistence management. The lower layers may include radios 290 and/or their controllers 276. In one design, MAR controller 240 may manage HLOS API 242 and/or may interface with applications 220 in the HLOS space.

MAR controller 240 may communicate with host processor 210 and/or applications 220 to receive requirements, preferences, and/or priorities of applications 220. MAR controller 240 may also communicate with radio controllers 276 to receive the capabilities and/or current status of radios 290. MAR controller 240 may send controls and data via coexistence manager 270 to adjust radio configurations, functions, and numbers of active radios that can provide good performance for active applications 220. MAR controller 240 may receive status from radio controllers 276 and may update radio functions in real-time to reduce interference between radios 290.

In one design, MAR controller 240 may manage databases within radio subsystem 204, including CnM database 280 and CxM database 282. MAR controller 240 may manage access to CnM database 280 and CxM database 282 and may also manage updates of databases 280 and 282 in real time and dynamically. This may be in contrast to a conventional design in which a main CPU and a HLOS API may operate from static and worst-case assumptions, static state machines, or pure software solutions, which may have high latency interactions and limited effectiveness.

In one design, MAR controller 240 may manage data bus 258 via which control and data may be transferred between MAR controller 240, connection manager 260, and coexistence manager 270. MAR controller 240 may operate as a bus master and may control data bus 258 for all entities, including radios 290, CnM controller 268, and CxM controller 278. MAR controller 240 may manage data bus 258 to send data to or receive data from a particular radio, a set of radios, or all radios. MAR controller 240 may manage the data, functions, and application aware calibration of radios 290 on data bus 258. Traffic may be dynamically routed through data bus 258, which may have low latency. This may allow MAR controller 240 to operate real time to provide improved radio functions for active applications. This may be in contrast to an implementation in which application requirements and radio conditions may be determined only infrequently, and expected operating parameters may be stored in a static structure such as a table and/or a state machine. In such an implementation, requested updates (e.g., based on interrupts) may generally be ignored by the operating environment, which may not be able to improve radio function in real time.

In one design, MAR controller 240 may provide CPU and memory resources for connection manager 260 and coexistence manager 270. CPU 244 within MAR controller 240 may perform processing for connection manager 260 and coexistence manager 270, e.g., as requested by these managers. Memory 246 may store data and/or program codes for connection manager 260 and coexistence manager 270. MAR controller 240 may also provide bus control and DMA/fabric resources for communications and data movement via MAR controller 240, connection manager 260, and coexistence manager 270. MAR controller 240 may support real-time interaction with applications 220 and radios 290 and may execute CnM and CxM decisions, which may conventionally be performed by HLOS functions, static state machines, or look-up tables.

In one design, MAR controller 240 may operate independent of any HLOS and any framework. In one design, MAR controller 240 may enable autonomous and independent operation of all radios connected to the system without any stalls or interrupts to the main CPUs. In one design, MAR controller 240 may operate as a black box and may be agnostic of HLOS 224 and main CPU(s) 226 of wireless device 110. This may allow MAR controller 240 to be implemented in various multi-radio wireless devices and architectures.

Figure 3:
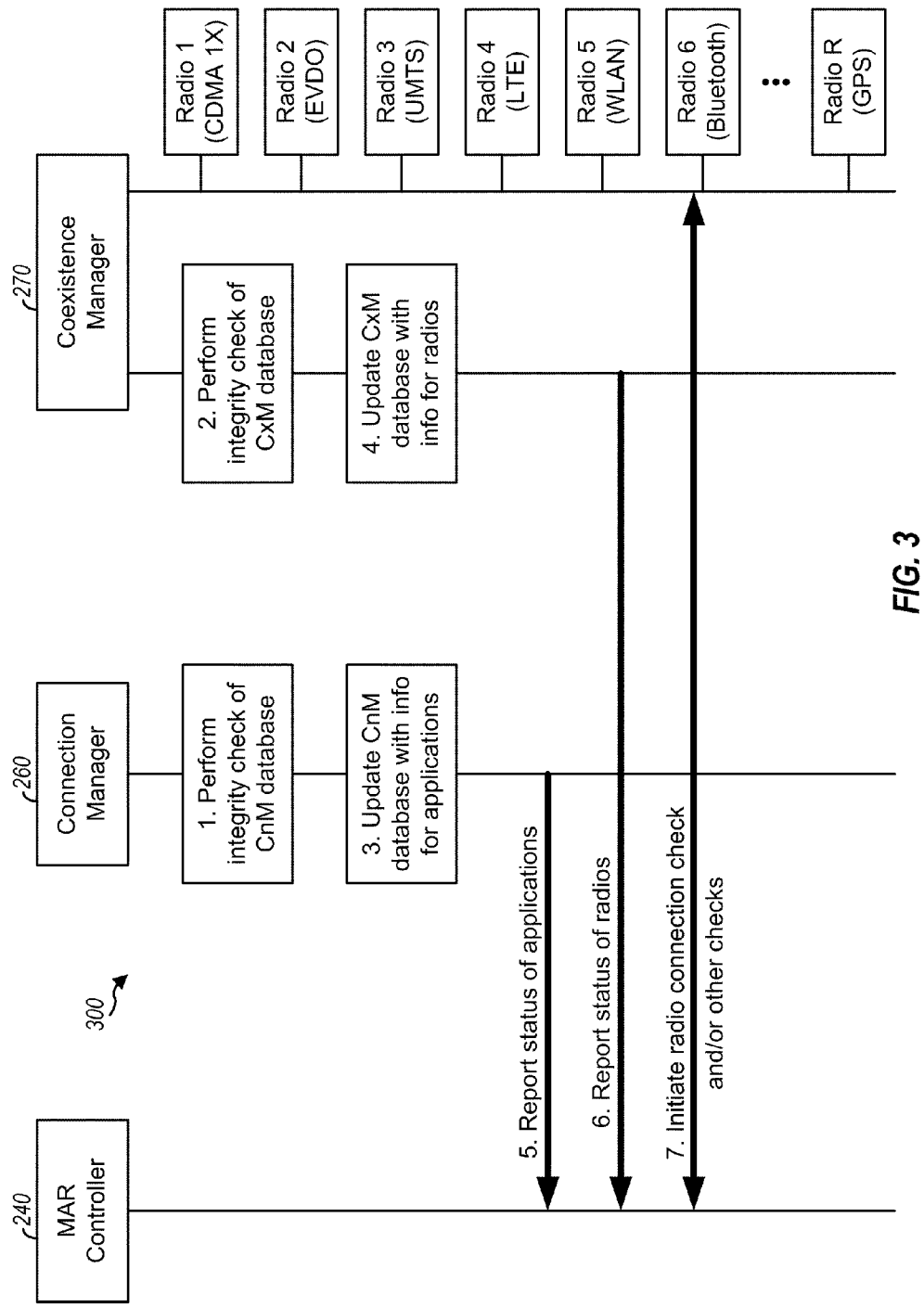

FIG. 3 shows a design of a call flow 300 for initialization when wireless device 110 is powered up. At power up, connection manager 260 may perform an integrity check of CnM database 280 (step 1). Similarly, coexistence manager 270 may perform an integrity check of CxM database 282 (step 2). The integrity check of each database may be performed by checking cyclic redundancy check (CRC) generated for information stored in that database or via some other mechanisms. Connection manager 260 may receive the status of applications 220 and may update CnM database 280 (step 3). Coexistence manager 270 may receive the status of radios 290 and their capabilities, determine interference information for active radios, and update CxM database 282 (step 4).

Connection manager 260 may report the status of applications 220 to MAR controller 240 (step 5). Similarly, coexistence manager 270 may report the status of radios 290 to MAR controller 240 (step 6). MAR controller 240 may initiate a radio connectivity check, an Internet connection check, and/or other checks for active radios listed in CnM database 280 and may save the results in CnM database 280 (step 7). The radio connectivity check may be to a base station, or an access point, or some other local entity, or as defined in the profile database. The Internet connection check may be to the Internet or some other remote entity. Alternatively, connection manager 260 may initiate the radio connectivity check and/or other checks and may report the results to MAR controller 240. The radio connectivity check and/or other checks may be defined in the profile database and may involve basic connectivity test (Yes/No), bandwidth/throughput estimate, received signal strength indicator (RSSI) measurement, etc. MAR controller 240 may maintain the status of all active radios 290.

Figure 4:
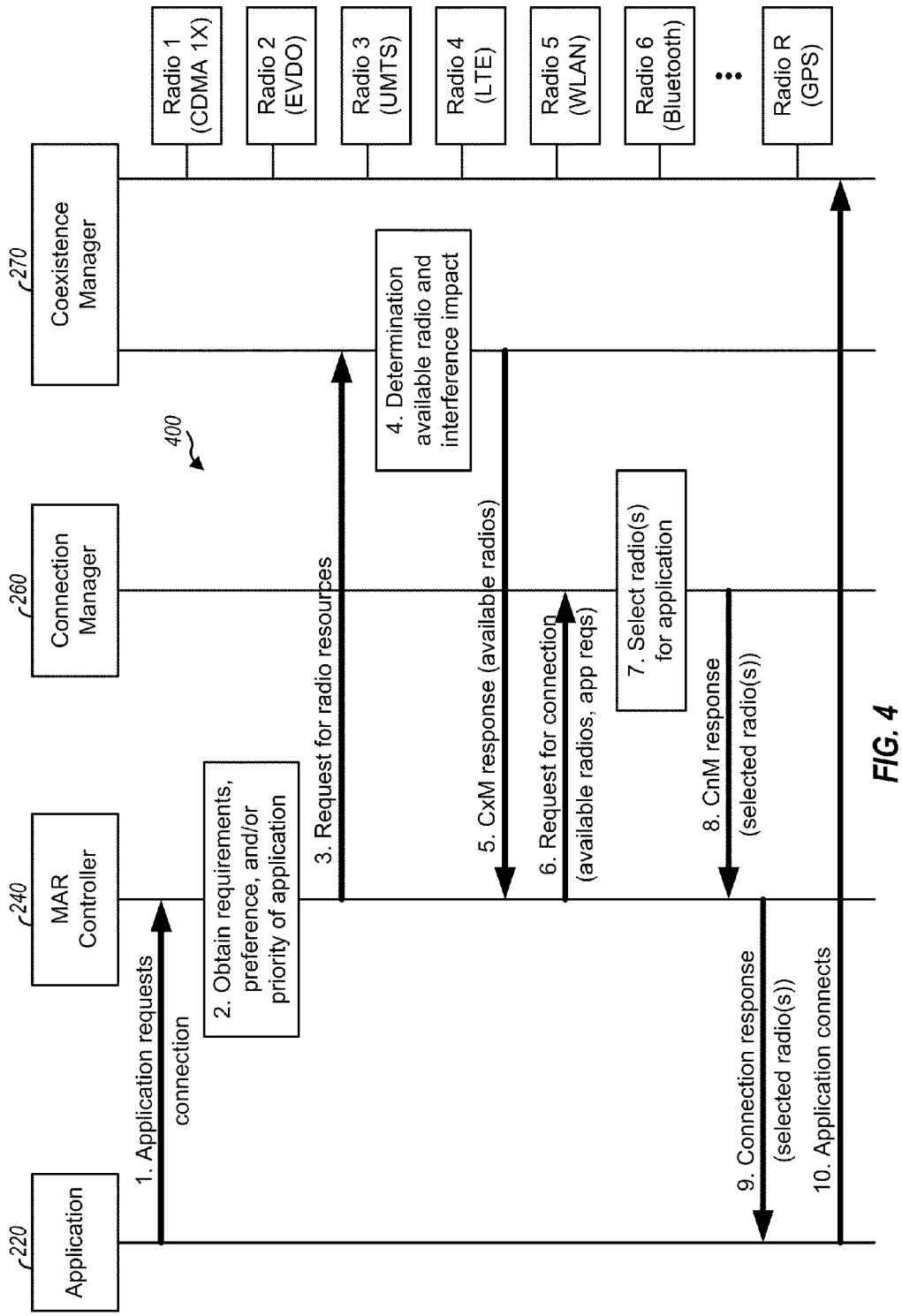
FIG. 4 shows a call flow for performing radio selection for an application.

FIG. 4 shows a design of a call flow 400 for performing radio selection for active applications. An application 220 may be launched and may request for a connection (step 1). MAR controller 240 may receive a connection request from application 220 and may obtain the requirements, preference, and/or priority of the application, e.g., from the application and/or the profile database (step 2). The requirements may include QoS requirements, throughput requirements, etc. MAR controller 240 may send a request for radio resources to coexistence manager 270 (step 3). Coexistence manager 270 may determine the available radios and the interference impact between these radios (step 4). Coexistence manager 270 may then return a CxM response, which may include a list of radios that are available for use (step 5).

MAR controller 240 may receive the response from coexistence manager 270 and may send a connection request and the CxM response to connection manager 260 (step 6). Connection manager 260 may select one or more available radios for the application (step 7). Connection manager 260 may then return a CnM response, which may include the mapping of the application to the selected radio(s) (step 8). MAR controller 240 may receive the CnM response and may provide the selected radio(s) to application 220 (step 9). Application 220 may then obtain connectivity via the selected radio(s) (step 10).

As shown in FIG. 4, the flow of process 400 may be from application 220 to MAR controller 240, and then to connection manager 260 and coexistence manager 270. MAR controller 240 may manage, update, override, and calibrate CnM database 280 and CxM database 282 during process 400.

MAR controller 240 may support real-time radio communication/control to determine the capabilities and/or status of radios 290. MAR controller 240 may support fast determination of interference conditions for the active radios. MAR controller 240 may also enable fast dynamic mapping of applications to radios and interference mitigation of active radios.

MAR controller 240 may interface between applications 220 and connection manager 260. MAR controller 240 may receive requirements, preferences, and/or priorities of applications 220 and may process and relay the information to connection manager 260 and CnM database 280. MAR controller 240 may perform initial information gathering and updating. MAR controller 240 may also manage and update profiles. MAR controller 240 may also maintain synchronization between various entities with which MAR controller 240 interacts.

MAR controller 240 may also interface between applications 220 and coexistence manager 270. MAR controller 240 may receive a list of radios 290 that satisfy the requirements, preferences, and/or priorities of applications 220, which may be provided by connection manager 260. MAR controller 240 may process information for applications 220 and may relay the information to coexistence manager 270 and CxM database 282. MAR controller 240 may receive interference information for groups of radios from HLOS API 242. MAR controller 240 may perform initial information gathering and updating. MAR controller 240 may update CxM database 282. MAR controller 240 may also manage communication to/from/between radios 290.

As an example, a WLAN radio at a 2400 MHz band (or "WLAN-2400") may be active initially. Connection manager 260 may receive a "Get Best System" request and/or a request for a suitable radio via which to place a voice call. Based on the received request, connection manager 260 may determine that a 1× radio at 800 MHz (or "1×-800") and a LTE radio at 2500 MHZ (or "LTE-2500") are candidate radios for the voice call. Connection manager 260 may check with coexistence manager 270 and/or MAR controller 240, which may advise that the combination of WLAN-2400 and LTE-2500 would result in severe interference and that 1×-800 is more advisable for the voice call. Accordingly, connection manager 260 may facilitate placing the voice call on the 1× radio at 800 MHz in order to avoid interference with the WLAN radio and provide better user experience.

MAR controller 240 may improve the performance of wireless device 110 in various manners. MAR controller 240 may support CnM and/or CxM functions and may provide various resources for connection manager 260 and coexistence manager 270. MAR controller 240 may operate with only connection manager 260, or only coexistence manager 270, or both connection manager 260 and coexistence manager 270. MAR controller 240 may avoid excessive involvement by other processors in wireless device 110 to manage connectivity for applications and operation of radios, which may avoid performance degradation to wireless device 110.

Wireless device 110 may be different from other wireless devices that do not include a MAR controller. These other wireless devices may include CnM and/or CxM functions in the upper layers (e.g., in the HLOS or applications) or in the lower layers (e.g., in the individual radios). An example of an upper layer implementation may be a connection manager implemented using HLOS APIs to individual radios. An example of a lower layer implementation may be a CxM bus between Bluetooth and WLAN radios, such as a Packet Traffic Arbitration (PTA) protocol.

In contrast, MAR controller 240 may be an intelligent manager of multiple controllers and may reside between (i) HLOS 224 and applications 220 and (ii) the individual radios 290 in wireless device 110. MAR controller 240 may operate in a real-time fashion to provide quick response to rapid changes in applications 220, radios 290, and radio conditions.

Figure 5:
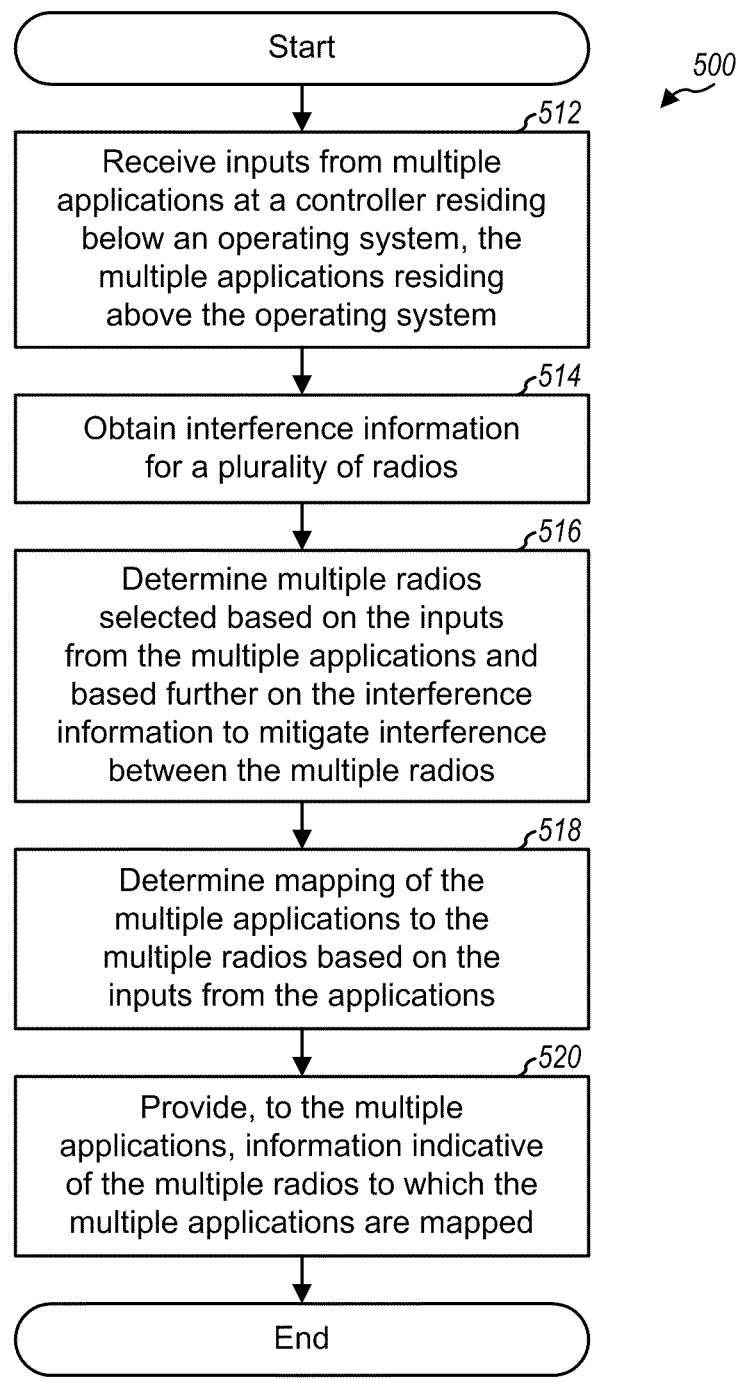
FIG. 5 shows a process for mapping applications to radios.

FIG. 5 shows a design of a process 500 for mapping applications to radios. Process 500 may be performed by a controller (e.g., MAR controller 240 in FIG. 2 or some other controller). The controller may receive inputs from multiple applications (block 512). The controller may reside below an operating system, and the multiple applications may reside above the operating system, e.g., as shown in FIG. 2. The controller may obtain interference information for a plurality of radios (block 514). The controller may determine multiple radios selected based on the inputs from the multiple applications and based further on the interference information to mitigate interference between the multiple radios (block 516). The controller may determine mapping of the multiple applications to the multiple radios based on the inputs from the applications (block 518). The controller may provide, to the multiple applications, information indicative of the multiple radios to which the multiple applications are mapped (block 520). The multiple applications may then obtain connectivity via their selected radios.

In one design, requirements of the multiple applications may be determined (e.g., based on the inputs of the applications) and may be used to select the multiple radios and/or to map the multiple applications to the multiple radios. In one design, preferences of the multiple applications may be determined (e.g., based on a profile database and/or the applications) and may be used to select the multiple radios and/or to map the multiple applications to the multiple radios. In one design, priorities of the multiple applications may be determined and used to map the multiple applications to the multiple radios. In one design, the capabilities and/or status of radios in the wireless device may be determined and used to select radios. In one design, the capability and/or status (e.g., battery level) of the wireless device may be determined and used to map the multiple applications to the multiple radios. Other information may also be used to select the radios and/or to map the applications to the radios.

In one design, the controller may communicate with entities (e.g., applications) in upper layers to obtain the requirements, preferences, and/or priorities of the multiple applications. In one design, the controller may communicate with entities (e.g., radio controllers) in lower layers to obtain the capabilities and/or status of the multiple radios. The multiple applications may be mapped to the multiple radios based on the requirements, preferences, and/or priorities of the multiple applications and the capabilities and/or status of the multiple radios. The controller may support real-time interaction with applications and radios. This may allow suitable radios to be selected for active applications to obtain good performance even in a changing environment.

In one design, the controller may control the operation of a connection manager, which may be designated to select radios for applications and/or to map applications to radios. In one design, the controller may send at least one connection request for the multiple applications to the connection manager. The controller may receive at least one response containing the mapping of the multiple applications to the multiple radios from the coexistence manager, e.g., as shown in FIG. 4.

In one design, the controller may control the operation of a coexistence manager, which may be designated to control the operation of radios to mitigate interference between the radios. In one design, the controller may send at least one request for radio resources for the multiple applications to the coexistence manager. The controller may receive at least one response containing the available radios from the coexistence manager. The multiple radios may be selected from among the available radios.

In one design, the controller may manage a first database for the connection manager and/or a second database for the coexistence manager. The controller may manage access of the databases, control updates of the databases, and/or perform other functions with regards to the databases. In one design, the controller may manage a data bus used for communication between the controller, the connection manager, and/or the coexistence manager. In one design, the controller may provide CPU resources, memory resources, and/or other resources for the connection manager and/or the coexistence manager. The controller may also perform other functions to support connection management and/or coexistence management.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of mapping applications to radio in a wireless communication device, comprising:
   receiving inputs from multiple applications at a controller residing below an operating system, the multiple applications residing above the operating system;
   obtaining interference information for the multiple radio technologies from an interference database;
   determining multiple radio technologies selected based on the inputs from the multiple applications and based further on the interference information to mitigate interference between communications of the multiple applications;
   determining mapping of the multiple applications to the multiple radio technologies based on the inputs from the application; and
   providing to the multiple applications information indicative of the multiple radio technologies to which the multiple applications are mapped.

2. The method of claim 1, further comprising: determining requirements of the multiple applications, and wherein the multiple applications are mapped to the multiple radio technologies based further on the requirements of the multiple applications.

3. The method of claim 1, further comprising: determining preferences of the multiple applications, and wherein the multiple applications are mapped to the multiple radio technologies based further on the preferences for the multiple applications.

4. The method of claim 1, further comprising: determining priorities of the multiple applications, and wherein the multiple applications are mapped to the multiple radio technologies based further on the priorities of the multiple applications.

5. The method of claim 1, further comprising: determining capabilities, or status, or both of a plurality of radio technologies in the wireless communication device, and wherein the multiple radio technologies are selected based on the capabilities, or status, or both of the plurality of radio technologies.

6. The method of claim 1, further comprising: determining capability, or status, or both of the wireless communication device, and wherein the multiple applications are mapped to the multiple radio technologies based further on the capability, or status, or both of the wireless communication device.

7. The method of claim 1, further comprising: communicating with entities in upper layers to obtain requirements, or preferences, or priorities, or a combination thereof of the multiple applications; and
communicating with entities in lower layers to obtain capabilities, or status, or both of the multiple radio technologies, and wherein the multiple applications are mapped to the multiple radio technologies based on the requirements, or preferences, or priorities, or a combination thereof of the multiple applications and the capabilities, or status, or both of the multiple radio technologies.

8. The method of claim 1, further comprising: supporting real-time interaction with the multiple applications and the multiple radio technologies by the controller.

9. The method of claim 1, further comprising: controlling operation of a connection manager designated to select radio technologies for applications, or to map applications to radios, or both.

10. The method of claim 9, wherein the determining the mapping of the multiple applications comprises sending at least one connection request for the multiple applications to the connection manager, and receiving at least one response with the mapping of the multiple applications to the multiple radio technologies from the connection manager.

11. The method of claim 1, further comprising: controlling operation of a coexistence manager designated to control operation of radio technologies to mitigate interference between the radio technologies.

12. The method of claim 11, wherein the determining the multiple radio comprises: sending at least one request for radio resources for the multiple applications to the coexistence manager, and receiving at least one response with available radio technologies from the coexistence manager, and wherein the multiple radios are among the available radio technologies.

13. The method of claim 1, further comprising:
controlling operation of a connection manager designated to select radio technologies for applications, or to map applications to radio technologies, or both; and
controlling operation of a coexistence manager designated to control operation of radio technologies to mitigate interference between the radio technologies.

14. The method of claim 1, further comprising: managing a first database for a connection manager, or a second database for a coexistence manager, or both.

15. The method of claim 1, further comprising: managing a data bus used for communication between the controller and a connection manager, or a coexistence manager, or both.

16. The method of claim 1, further comprising: providing central processing unit (CPU) resources, or memory resources, or both for a connection manager, or a coexistence manager, or both.

17. The method of claim 1, further comprising: obtaining a set of available radio technologies at power up of the wireless device; and
initiating a radio connection check, or an Internet connection check, or both for the set of available radio technologies.

18. An apparatus for mapping applications to radio in a wireless communication device, comprising:
means for receiving inputs from multiple applications at a controller residing below an operating system, the multiple applications residing above the operating system;
means for obtaining interference information for the multiple radio technologies from an interference database;
means for determining multiple radio technologies selected based on the inputs from the multiple applications and based further on the interference information to mitigate interference between communications of the multiple applications;
means for determining mapping of the multiple applications to the multiple radios based on the inputs from the applications; and
means for providing to the multiple applications information indicative of the multiple radio technologies to which the multiple applications are mapped.

19. The apparatus of claim 18, further comprising: means for determining requirements, or preferences, or priorities, or a combination thereof, of the multiple applications, and wherein the multiple applications are mapped to the multiple radio technologies based further on the requirements, or preferences, or priorities, or a combination thereof, of the multiple applications.

20. The apparatus of claim 18, further comprising:
means for communicating with entities in upper layers to obtain requirements, or preferences, or priorities, or a combination thereof of the multiple applications; and
means for communicating with entities in lower layers to obtain capabilities, or status, or both of the multiple radio technologies, and wherein the multiple applications are mapped to the multiple radio technologies based on the requirements, or preferences, or priorities, or a combination thereof of the multiple applications and the capabilities, or status, or both of the multiple radio technologies.

21. The apparatus of claim 18, further comprising: means for controlling operation of a connection manager designated to select radio technologies for applications, or to map applications to radio technologies, or both.

22. The apparatus of claim 18, further comprising: means for controlling operation of a coexistence manager designated to control operation of radio to mitigate interference between the radio.

23. The apparatus of claim 18, further comprising: means for managing a first database for a connection manager, or a second database for a coexistence manager, or both.

24. An apparatus for mapping applications to radios in a wireless communication device, comprising:
at least one processor configured:
to receive inputs from multiple applications at a controller residing below an operating system, the multiple applications residing above the operating system,
to obtain interference information for the multiple radio technologies from an interference database,
to determine multiple radio technologies selected based on the inputs from the multiple applications and based further on the interference information to mitigate interference between communications of the multiple applications,
to determine mapping of the multiple applications to the multiple radio technologies based on the inputs from the applications; and
wherein the at least one processor is configured to provide to the multiple applications information indicative of the multiple radios to which the multiple applications are mapped.

25. The apparatus of claim 24, wherein the at least one processor is configured to determine requirements, or preferences, or priorities, or a combination thereof, of the multiple applications, and wherein the multiple applications are mapped to the multiple radio technologies based further on the requirements, or preferences, or priorities, or a combination thereof, of the multiple applications.

26. The apparatus of claim 24, wherein the at least one processor is configured to communicate with entities in upper layers to obtain requirements, or preferences, or priorities, or a combination thereof of the multiple applications, and to communicate with entities in lower layers to obtain capabilities, or status, or both of the multiple radio technologies, and wherein the multiple applications are mapped to the multiple radio technologies based on the requirements, or preferences, or priorities, or a combination thereof of the multiple applications and the capabilities, or status, or both of the multiple radio technologies.

27. The apparatus of claim 24, wherein the at least one processor is configured to control operation of a connection manager designated to select radio technologies for applications, or to map applications to radio technologies, or both.

28. The apparatus of claim 24, wherein the at least one processor is configured to control operation of a coexistence manager designated to control operation of radio technologies to mitigate interference between the radio technologies.

29. The apparatus of claim 24, wherein the at least one processor is configured to manage a first database for a connection manager, or a second database for a coexistence manager, or both.

30. A computer program product, comprising:
a non-transitory computer-readable medium comprising:
   code for causing at least one computer to receive inputs from multiple applications at a controller residing below an operating system, the multiple applications residing above the operating system,
   code for causing the at least one computer to obtain interference information for the multiple radio technologies from an interference database,
   code for causing the at least one computer to determine multiple radio technologies selected based on the inputs from the multiple applications and based further on the interference information to mitigate interference between communications of the multiple applications,
   code for causing the at least one computer to determine mapping of the multiple applications to the multiple radio technologies based on the inputs from the applications; and
   code for causing the at least one computer to provide to the multiple applications information indicative of the multiple radios to which the multiple applications are mapped.

* * * * *